(12) United States Patent
Rai et al.

(10) Patent No.: US 8,129,873 B2
(45) Date of Patent: Mar. 6, 2012

(54) STATOR COIL COOLANT FLOW REDUCTION MONITORING

(75) Inventors: Sudhanshu Rai, Ghazipur (IN); Nicola Piccirillo, Scotia, NY (US); Subrat Kumar Sahoo, Bangalore (IN); Ravikumar Sandrana, Bangalore (IN)

(73) Assignee: General Electronic Company, Schenectady, NY (US)

( * ) Notice: Subject to any disclaimer, the term of this patent is extended or adjusted under 35 U.S.C. 154(b) by 79 days.

(21) Appl. No.: 12/754,010

(22) Filed: Apr. 5, 2010

(65) Prior Publication Data
US 2011/0241458 A1   Oct. 6, 2011

(51) Int. Cl.
*H02K 9/24* (2006.01)
*H02H 7/06* (2006.01)

(52) U.S. Cl. ......... 310/53; 310/68 C; 702/130; 340/584; 361/25

(58) Field of Classification Search .............. 310/52–55, 310/68 C; 340/490, 648; 361/25
See application file for complete search history.

(56) References Cited

U.S. PATENT DOCUMENTS

| | | | |
|---|---|---|---|
| 2,975,308 A * | 3/1961 | Kilbourne et al. ............. 310/54 |
| 4,602,872 A | 7/1986 | Emery et al. | |
| 4,698,756 A * | 10/1987 | Gonzalez et al. ............. 702/130 |
| 4,733,225 A | 3/1988 | Uematsu et al. | |
| 4,808,867 A | 2/1989 | Wichmann et al. | |
| 5,701,044 A * | 12/1997 | Emshoff et al. ................ 310/54 |
| 6,828,701 B1 * | 12/2004 | Berggren et al. ........... 310/68 C |

FOREIGN PATENT DOCUMENTS

| CN | 101109779 A | 1/2008 |
|---|---|---|
| JP | 11150993 A | 6/1999 |
| WO | 9407152 A1 | 3/1994 |

OTHER PUBLICATIONS

European Patent Application Serial No. 11160981.4, Search Report dated Jun. 1, 2011.

* cited by examiner

*Primary Examiner* — Burton Mullins
(74) *Attorney, Agent, or Firm* — Hoffman Warnick LLC; Ernest G. Cusick

(57) ABSTRACT

A coolant flow reduction monitoring system for a rotary electric machine having stator coils within a plurality of slots of a stator thereof is provided. The stator coils are cooled by a coolant flowing in a plurality of passages provided in the stator coils. The system includes an outlet temperature sensor for measuring a coolant outlet temperature of the coolant in an outlet of at least one of the plurality of passages, a slot temperature sensor for measuring a temperature in at least one slot at a location along a length of each slot and outside of the stator coils, and an inlet temperature sensor for measuring a coolant inlet temperature of the coolant. A coolant flow reduction monitor generates an alarm indicating a coolant flow reduction based on the at least one coolant outlet temperature, the at least one slot temperature and the coolant inlet temperature.

15 Claims, 3 Drawing Sheets

STATOR COIL COOLANT FLOW REDUCTION MONITORING

BACKGROUND OF THE INVENTION

The disclosure relates generally to rotary electric machines, and more particularly, to monitoring of stator coil coolant flow reduction.

Rotary electric machines such as an electrical generator include a rotor within a stator, the latter of which includes a number of conductor sections having slots therein into which stator coils are placed. During operation or, specifically, delivering output power, the generator creates heat such that direct liquid cooling of the stator coils is required to prevent overheating. A cooling liquid, e.g., de-ionized water with anti-freeze, is passed through passages in the stator coils. One challenge relative to the cooling process is that coolant flow is subject to flow reduction up to and including complete blockage, either of which can cause a forced outage of the electric generator. A portion of the stator coils can have a coolant flow reduction due to, for example, debris, loose solids, swelling of existing material, or gas locking. During coolant flow reduction, a reduced liquid flow causes a rise in the slot (winding/coil) temperature and subsequently the coolant outlet temperature, which may result in coil failure.

In order to prevent forced outage due to flow reduction, stator coils are protected from overheating by monitoring coolant outlet temperature. This monitoring, however, is limited in its efficacy due to its limited scope. Another challenge in performing the monitoring is that data received through the sensors may have quality issues such as erratic behavior of the sensor, noise in the sensor, improper calibration, connection/wiring issues, etc. Consequently, the ability to validate the sensors such that coolant flow reduction can be diagnosed over a long duration is a concern.

BRIEF DESCRIPTION OF THE INVENTION

A first aspect of the disclosure provides a coolant flow reduction monitoring system for a rotary electric machine having stator coils within a plurality of slots of a stator thereof, the stator coils cooled by a coolant flowing in a plurality of passages provided in the stator coils, the system comprising: an outlet temperature sensor for measuring a coolant outlet temperature of the coolant in an outlet of at least one of the plurality of passages and outputting a signal indicative of each; a slot temperature sensor for measuring a temperature in at least one slot at a location along a length of the at least one slot and outside of the stator coils therein, and outputting a signal indicative thereof; an inlet temperature sensor for measuring a coolant inlet temperature of the coolant at an inlet to the plurality of passages and outputting a signal indicative thereof; and a coolant flow reduction monitor for generating an alarm indicating a coolant flow reduction based on the at least one coolant outlet temperature, the at least one slot temperature and the coolant inlet temperature.

A second aspect of the disclosure provides an electric generator comprising: a rotor; a stator including stator coils within a plurality of slots, the stator coils cooled by a coolant flowing in a plurality of passages provided in the stator coils; and a coolant flow reduction monitoring system including: an outlet temperature sensor for measuring a coolant outlet temperature of the coolant in an outlet of at least one of the plurality of passages and outputting a signal indicative of each; a slot temperature sensor for measuring a temperature in at least one slot at a location along a length of the at least one slot and outside of the stator coils therein, and outputting a signal indicative thereof; an inlet temperature sensor for measuring a coolant inlet temperature of the coolant at an inlet to the plurality of passages and outputting a signal indicative thereof; and a coolant flow reduction monitor for generating an alarm indicating a coolant flow reduction based on the at least one coolant outlet temperature, the at least one slot temperature and the coolant inlet temperature.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

Figure 1:
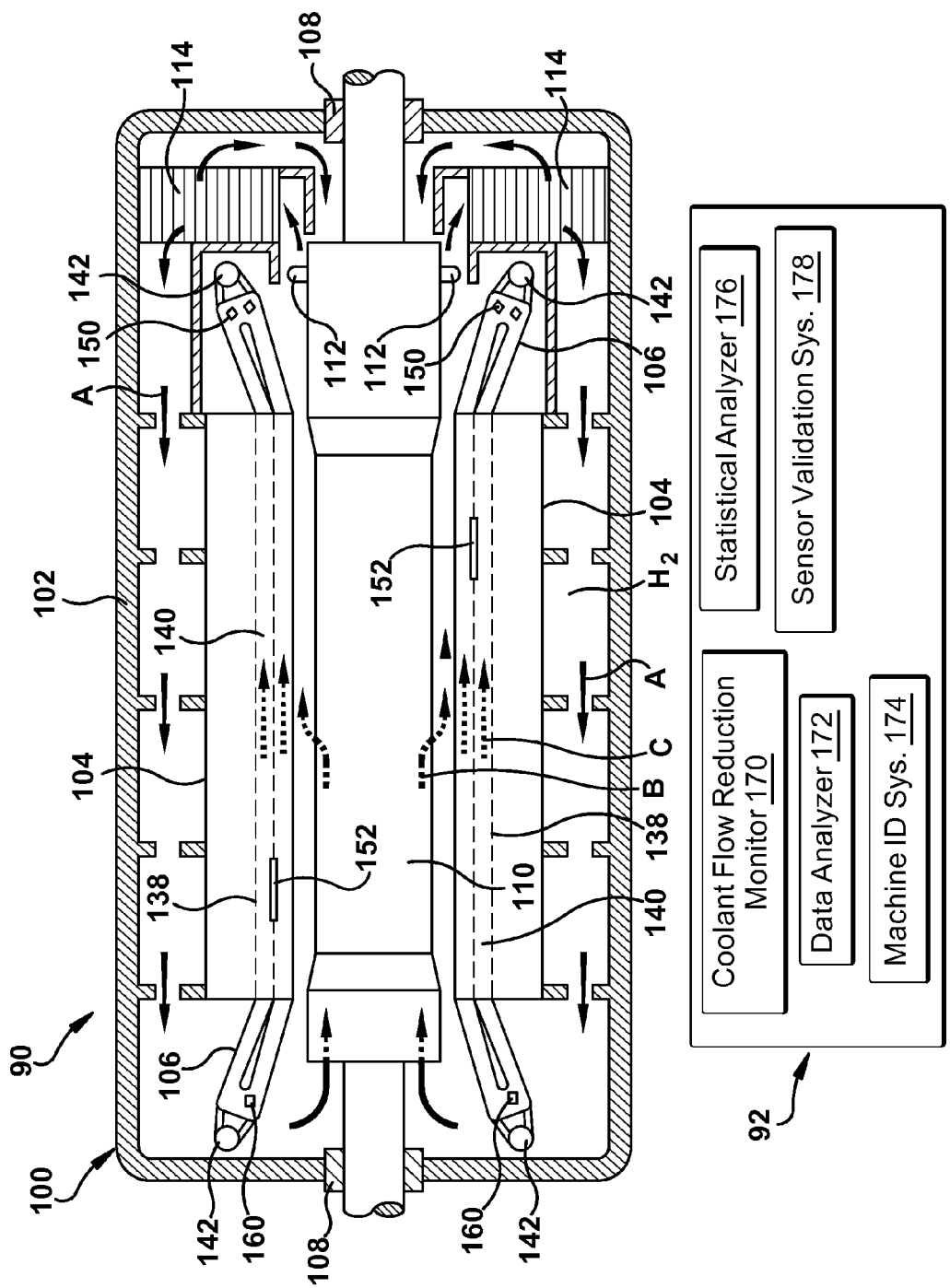
FIG. 1 shows a cross-sectional side view of a generator with a block diagram of a coolant flow reduction monitoring system for use with the generator according to embodiments of the invention.

Referring to FIG. 1, a cross-sectional side view of a rotary electric machine 90 having stator coils cooled by a coolant flowing in a plurality of passages provided in the stator coils is illustrated according to embodiments of the invention. In one example, the rotary electric machine includes a generator 100, as illustrated. However, the teachings of the invention are not so limited. A coolant flow reduction monitoring system 92 for generator 100, as will be described in greater detail herein, is also illustrated in schematic form. Although not shown, monitoring system 92 may include an interface (e.g., a graphical user interface) for a user to input unit specific configurable parameters such as thresholds, machine rating like MegaWatts, machine model, armature current, Mega Volt Ampere (MVA), etc., as will be described herein. As used herein, "flow reduction" may include any type of decreased coolant flow from a maximum flow capability up to and including coolant flow blockage.

Generator 100 includes a frame 102 having an airtight structure to seal a cooling gas, e.g., hydrogen, therein. A stator core 104 includes a stator coil 106 surrounding a rotor 110, which is supported by bearings 108 at both ends. A blower 112 may project from an outer periphery of one end of rotor 110 to move hydrogen $H_2$ from a hydrogen gas cooler 114 through frame 102. Arrows A show the direction of flow of the low temperature hydrogen gas, and arrows B show hydrogen gas flow in the rotor coil. Hydrogen gas is sealed in frame 102, and fed to gas cooler 114 by blower 112 where it is cooled.

Figure 2:
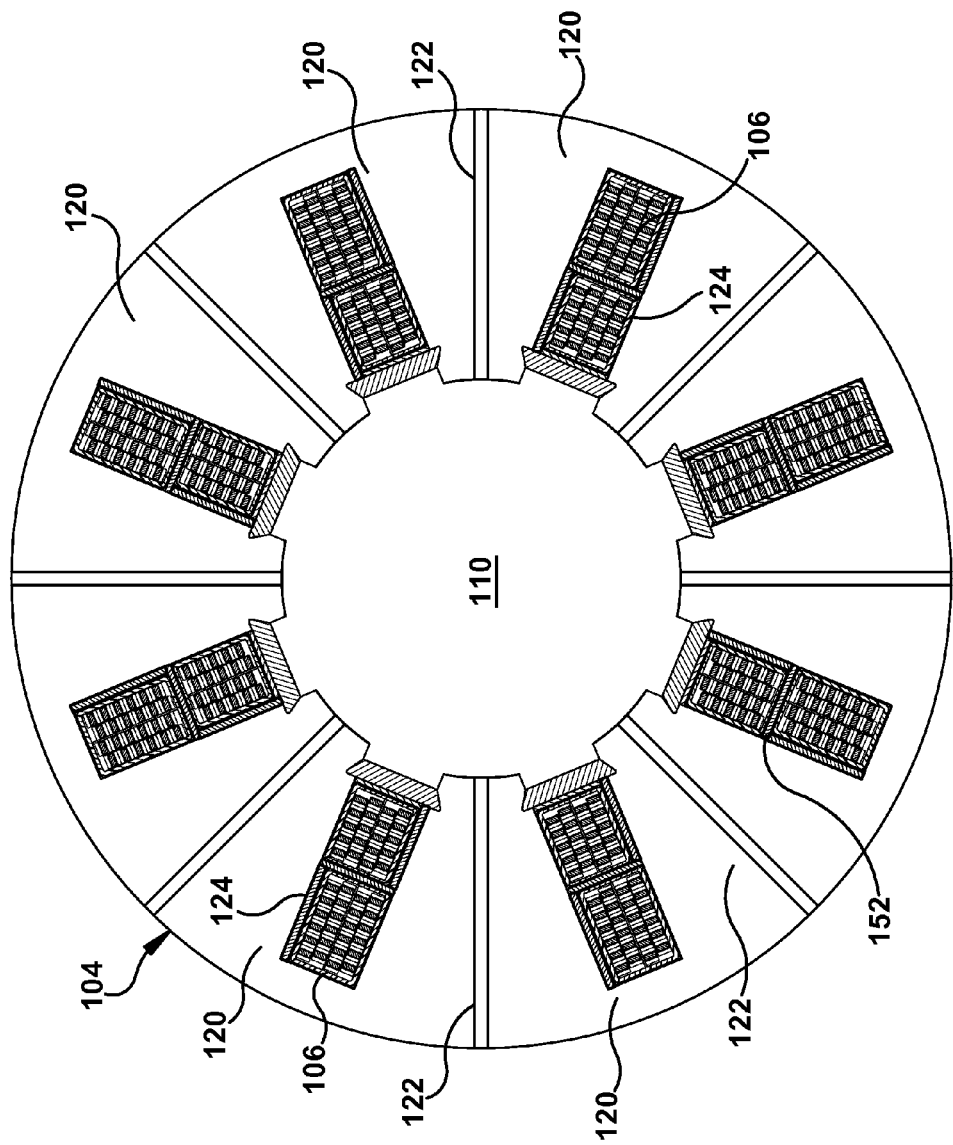
FIG. 2 shows a cross-sectional end view of the stator of the generator.
Figure 3:
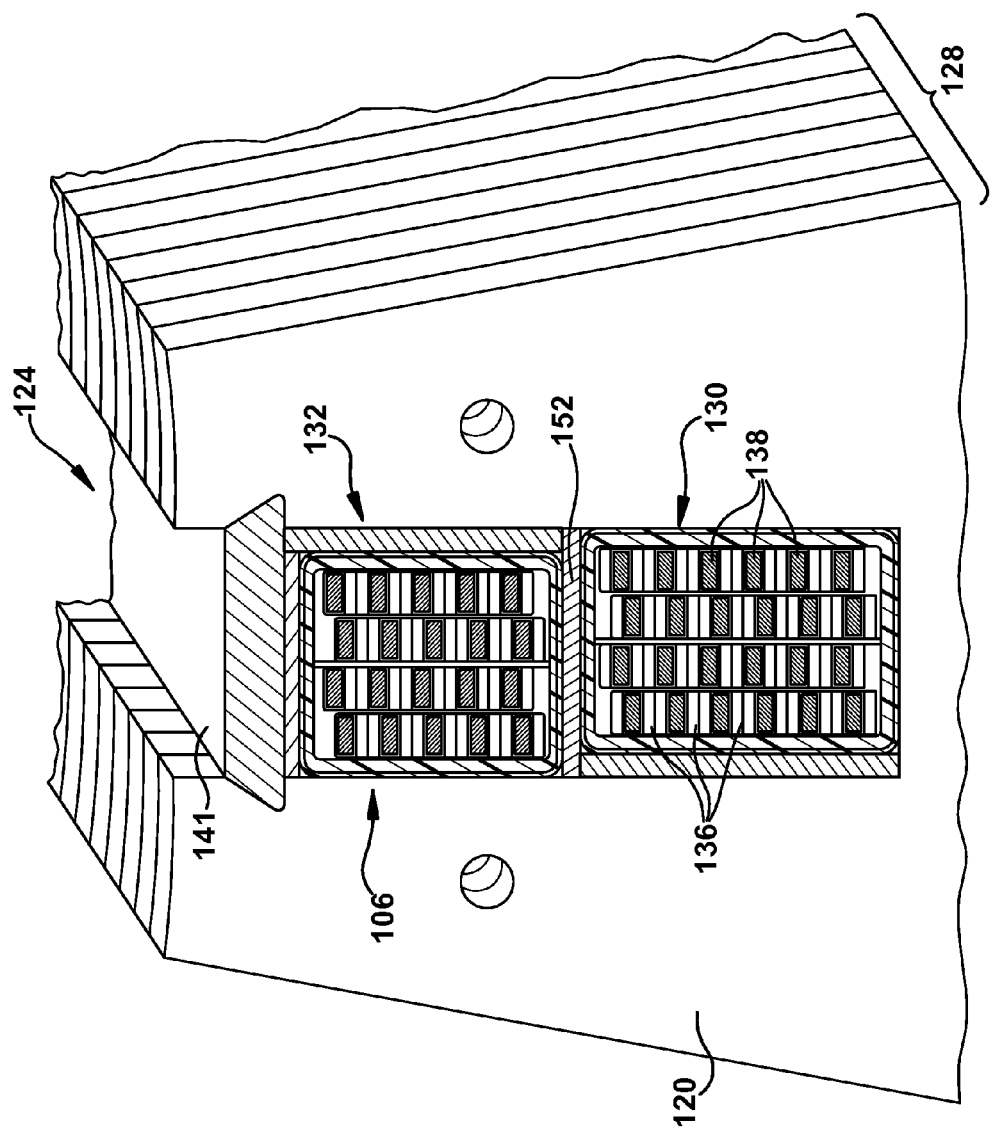
FIG. 3 shows a detailed perspective view of a slot in a stator core section.

Referring to FIG. 2, a simplified, cross-sectional end view of stator core 104 is illustrated. Stator core 104 includes a plurality of arcuate sections 120. A space 122, through which hydrogen gas may pass, may extend between each arcuate section 120. In addition, each section 120 includes a slot 124 into which stator coils 106 are positioned. FIG. 3 shows a simplified, enlarged perspective view of one of arcuate sections 120. Each section 120 includes a plurality of stacked layers 128 of a metal. FIG. 3 also illustrates two coil sections of stator coil 106: a bottom half coil 130 and a top half coil 132 positioned within slot 124 of stator core 104 (FIG. 1). Each of coils 130, 132 includes a plurality of insulated electrical conductor bars or windings. Some conductor bars 136 are solid and other conductor bars constitute hollow passages 138. As understood, conductor bars 136, 138 may be additionally surrounded by insulating layers (not numbered) separated by spacing members with the conductor bars being held in position by a locking member 141, e.g., a wedge-spring member. As shown in FIG. 1, passages 138 conduct a coolant 140, e.g., water, throughout the length of stator core 104. Coolant 140 from each passage 138 is collected and circulated via a manifold 142 coupled to each passage 138 by appropriate conduits. Arrows C show the path of coolant 140, which although not shown, may be bi-directional. While the FIGS. illustrate one type of generator 100, it is understood that the teachings of the invention are not limited to any particular generator structure.

In embodiments of the invention, as shown in FIG. 1, coolant flow reduction monitoring system 92 includes an outlet temperature sensor 150 for measuring a coolant outlet temperature of coolant 140 in an outlet of at least one of the plurality of passages 138. In one embodiment, at least one passage 138 in each slot 124 includes an outlet temperature sensor 150. Outlet temperature sensors 150 each output a signal indicative of the temperature of coolant in a respective passage 138. The readings may be combined, e.g., via averaging, if desired, by coolant flow reduction monitor 170. Each coolant outlet temperature sensor 150 may include any now known or later developed sensor capable of obtaining the temperature of coolant 140, e.g., a thermocouple, etc. In contrast to conventional systems, as shown in FIGS. 1 and 3, coolant flow reduction monitoring system 92 may also include a slot temperature sensor 152 for measuring a temperature in each slot 124 at a location along a length of the slot (see FIG. 1), outside of stator coils 106, i.e., conductor bars 136 or passages 138. For example, a sensor 152 may be at a location other than near the outlet of each of the plurality of passages 138. That is, each slot 124 may include its own slot temperature sensor 152. Alternatively, if desired, each slot 124 may include numerous slot temperature sensors 152, e.g., along its length. Each slot temperature sensor 152 outputs a signal indicative of the temperature at the location in slot 124. Slot temperature sensors 152 may include any now known or later developed sensor capable of obtaining the temperature in slot 124, e.g., a thermocouple, resistance temperature detector (RTD), etc.

As shown in FIG. 1, coolant flow reduction monitoring system 92 may also include an inlet temperature sensor 160 for measuring a coolant inlet temperature of coolant 140 at an inlet to plurality of passages 138 and outputting a signal indicative thereof. Although four sensors 160 are shown, one or more can also be used. The "inlet" may be at the inlet of each passage individually or within a manifold that delivers coolant 140 to the inlet of each passage 138. Inlet temperature sensor(s) 160 may include any now known or later developed sensor capable of obtaining the temperature of coolant 140, e.g., a thermocouple, resistance temperature detector (RTD), etc. Although more than one temperature sensor 160 may be used, the coolant inlet temperature is used as a single temperature. That is, where more than one is measured, the temperature measurements are combined, e.g., by averaging.

Each temperature sensor 150, 152, 160 may include a sensor component(s) at each of the stated positions at which it is to obtain a reading. That is, where a sensor 150, 152, 160 is stated as measuring a temperature at numerous locations, it is understood that each location includes a sensor component to attain a reading at the location.

Coolant flow reduction monitoring system 92 also includes a coolant flow reduction monitor 170 for generating an alarm indicating a coolant flow reduction based on the at least one coolant outlet temperature, the at least one slot temperature and the coolant inlet temperature. Different rotary electric machines 90 have different sizes with, e.g., different stator 104 and stator coil 106 size and number, and each machine presents different operating conditions. An "operating condition" may be based on one or more parameters such as but not limited to: generator load, coolant flow rate, coolant inlet temperature, coolant pressure, armature current, MegaWatts, MVA, etc. Consequently, different operating condition(s) may be presented during operation of a single machine and between different machines. In order to address different operating condition(s) within a selected machine, coolant flow reduction monitoring system 92 includes a data analyzer 172 that normalizes the coolant outlet temperature(s) and the slot temperature(s) based on an operating condition, e.g., load, of the rotary electric machine. For example, a rise in slot temperature and/or coolant outlet temperature may be normalized by data analyzer 172 with respect to load to compensate for an expected and acceptable rise in temperature due to increased load changes, i.e., a higher load naturally increases temperature but does not necessarily indicate coolant flow reduction. A myriad of normalization techniques exist and may be used. For example, a normalization of temperature with respect to current may be calculated by multiplying the measured temperature times the square of the rated current divided by the measured current. The above-described approach can be applied with different operating conditions such as MegaWatts/armature current, MVA, etc. In addition, since, as noted above, different generators have different structure, e.g., number of slots, stator coil circuits, type of coolant flow (one pass, two pass, etc.), etc., coolant flow monitoring system 92 may include a machine identification (ID) system 174 for identifying the type of electric rotary machine with which it is implemented. Machine identification system 174 may include logic for determining the type of machine or an input mechanism for a user to input a code for identifying the type of machine or configuration of parts thereof.

Coolant flow reduction monitor 170 may create an alarm to indicate coolant flow reduction based on a variety of situations.

In one embodiment, coolant flow reduction monitor 170 may generate the alarm in response to a rate of change of an average of a difference between the at least one coolant outlet temperature and the coolant inlet temperature exceeding a first threshold, and a rate of change of an average of a difference between the at least one slot temperature and the coolant inlet temperature exceeding a second threshold. That is, a difference between each slot temperature and the coolant inlet temperature, and each coolant outlet temperature and the coolant inlet temperature is calculated to address changes in the coolant inlet temperature. The frequency of the measurements and calculation can be user defined, e.g., once per minute, once per 5 minutes, etc. A difference compared to coolant inlet temperature as a baseline is calculated because a rise in the respective temperatures, i.e., slot temperature(s) and coolant outlet temperature(s), does not necessarily indicate coolant flow reduction because the coolant inlet temperature may be rising due to other reasons, e.g., change in ambient conditions. In an alternative embodiment, the average coolant outlet temperature could also be used as the baseline since it is directly proportional to load, e.g., based on operating conditions such as load changes.

Next, an average of all slot temperature and coolant inlet temperature differences is calculated, and an average of all coolant outlet temperature and coolant inlet temperature differences is calculated. The time frame over which the averages are calculated may be user defined, e.g., a minute, 5 minutes, an hour, etc. The rate of change of the two averages is observed over time. The basis for the rate of change can also be user defined, e.g. ° C./hour, ° C./half hour, ° C./day, etc. An alarm indicating coolant flow reduction in the whole circuit or in one or more slots is generated if both rates of change of the averages of the differences exceed their respective thresholds. That is, there is a first threshold for rate of change of slot temperature average differences and a second threshold for rate of change of coolant outlet temperature average differences. A statistically significant rise in an average of differences for all slot temperatures compared to the coolant inlet temperature and an average of differences for all coolant outlet temperatures compared to coolant inlet temperature over a period of time may indicate general clogging in the whole coolant circuit or reduced coolant flow in one or more slots 124. The thresholds indicating sufficient rise in average temperature differences can be user defined based on benchmark cases, and set in any manner capable of meaningful interpretation relative to the rates of change, e.g., as a rate of change itself, a percentage of rate of change versus a standard, etc. A "benchmark case" may include rates of change of slot temperature(s), coolant outlet temperature(s) and coolant inlet temperatures that are known to (or highly suspected to) cause a coolant flow reduction for a rotary electric machine that is identical to, or substantially similar to, the rotary electric machine under test. An example of implementation of the above-described embodiment may be as follows: with a rate of change of an average difference in coolant outlet temperature versus coolant inlet temperature being 4° C./hour, the threshold may be stated as a rate of change of 4.5° C./hour period. In this case, no alarm would be generated. The above-described embodiment may be applied across a range of time periods. For example, the measurements and calculations may be performed for numerous layered thresholds for, e.g., different time frames. For example, the same calculations as described above may be performed after two hours resulting in a 6° C./2 hour period rate of change. Here, the threshold may be 4.5° C./2 hour period, which would result in an alarm.

In another embodiment, coolant flow reduction monitor 170 generates the alarm in response to a rate of change of a difference between a slot temperature of a selected slot and coolant inlet temperature exceeding a first threshold, and a rate of change of a difference between coolant outlet temperature(s) in the selected slot and coolant inlet temperature exceeding a second threshold. That is, as described above, a difference between a selected slot's slot temperature and the coolant inlet temperature, and a difference between coolant outlet temperature(s) of the selected slot and the coolant inlet temperature are calculated to address changes in the coolant inlet temperature. The frequency of the measurements and calculation can be used defined, e.g., once per minute, once per 5 minutes, etc. Next, a rate of change of the two differences are calculated over a predetermined time frame(s), e.g., hour, 2 hour, day, etc. In this manner, coolant flow reduction monitor 170 can detect coolant flow reduction in a particular slot 124. In particular, a statistically significant rise in particular winding slot temperature and a corresponding coolant outlet temperature(s) for a passage(s) 138 in the particular slot 124 versus coolant inlet temperature over a period of time indicates reduced coolant flow in the particular slot. The thresholds indicating sufficient rise in temperature differences can be user defined based on benchmark cases, and set in any manner capable of meaningful interpretation relative to the rates of change, e.g., as a rate of change itself, a percentage of rate of change versus a standard, etc.

In another embodiment, coolant flow reduction monitor 170 generates the alarm in response to a coolant outlet temperature of a particular passage 138 in a particular slot 124 exceeding an average of coolant outlet temperature(s) and a slot temperature for the particular slot 124 in which the particular passage 138 is positioned exceeding an average of slot temperature(s). That is, each slot temperature is compared against the average of all slot temperatures and each coolant outlet temperature is compared against the average of all coolant outlet temperatures. If any slot temperature and corresponding coolant outlet temperature in the same passage is operating, for example, at 3-6° C. higher than a respective average, it may indicate coolant flow reduction in a particular slot. In some instances, this embodiment may generate false alarms due to seasonal changes, e.g., changes in climatic conditions. In this case, trending methods (e.g., monitoring the behavior of the machine over a period of time), as described herein, may be implemented to add confidence to the alarm.

Coolant flow reduction monitor 170 may also generate an alarm in response to a high or low slot temperature, coolant outlet temperature or coolant inlet temperature. In these cases, such an alarm would not necessarily indicate coolant flow reduction, but would simply provide an indication of the state of the temperature(s).

The alarm may take a variety of forms such as an audible alarm, e.g., siren, beeping on console, etc., or a visual alarm, e.g., flashing light on console, etc. The alarm may also include an instruction including a corrective action to at least partially correct the coolant flow reduction. For example, it may indicate something like: "mild coolant flow reduction: temporarily increase coolant flow," "failure imminent, commence shut down procedure", etc. Alternatively, or in addition thereto, the instruction may provide specificity about where corrective action is required. For example, if monitor 170 indicates coolant flow reduction in a particular slot 124, the alarm may indicate "coolant blockage correction required in slot number # 342" so that work can be focused on the particular slot.

Coolant flow reduction monitoring system 92 may also include a statistical analyzer 176 for monitoring a rate of change in the slot temperature(s) and a rate of change in the coolant outlet temperature(s), and predicting a failure time based on a benchmark case (as defined herein) of the rotary electric machine. In this case, rates of change in data are measured over a long period of time (e.g., weeks, months, years) and compared against the benchmark case. In one example, monitoring the rate of change in slot temperature rise and coolant outlet temperature rise compared to coolant inlet temperature over a period of time and comparing against the benchmark case helps in predicting the time to failure of a machine as the rate of change reaches a threshold. The threshold can be any manner of value signifying sufficient closeness of rate of change to the benchmark case's rate of change that lead to a reduction in flow, e.g., it could be a temperature rate change of 2° C./week. Several statistical methods can be applied in predicting the time of failure or the anomaly reaching the threshold. For example, trending rate (s) of the slot temperature(s) and/or coolant outlet temperature(s) rise over a period of time can be generated and extrapolated with statistical bounds to predict when the machine is going to reach a threshold (e.g., calculated based on a benchmark case). Another approach could include implementing a transfer function for slot temperature and/or coolant outlet temperature as a function of operating conditions (e.g., load, armature current, coolant inlet temperature, bulk coolant outlet temperature, coolant flow rate, coolant flow pressure, etc.) and predicting a time when the machine is going to reach a threshold (e.g., calculated based on a benchmark case). Other statistical approaches may also be employed.

Coolant flow reduction monitoring system 92 may also include a sensor validation system 178 for validating the temperature sensors 150, 152, 160 in response to the signals being within a specified amplitude range. In particular, changes in signals from temperature sensors 150, 152, 160 may be created by such things as noise or a broken sensor. Evaluation of whether a reading of a particular signal is within an expected range (e.g., based on load), or is atypically erratic or flat, or whether a significant change in response time from sensor to sensor exists, may indicate a sensor needs repair or replacement. If signals are not within the specified amplitude range, then the data is considered bad and reliance thereon is halted. In addition, an alarm may be generated by sensor validation system 178 similar to that described herein indicating sensor problems.

Some generators are equipped with other liquid-cooled components such as high voltage bushings and armature connection rings (not shown). In this case, the coolant flow circuits are separate from those of stator coils 106. Each of these additional flow circuits may also be monitored as described herein using, e.g., coolant outlet header thermocouples. Separate limits can be implemented based on the association of the respective sensor with the connection ring.

Coolant flow reduction monitoring system 92 may also optimize any of the herein-described parameters, e.g., thresholds, based on type of machine and/or historical behavior and/or user input using any now known or later developed optimization techniques.

An advantage that may be realized in the practice of some embodiments of the described coolant flow reduction monitoring system 92 and techniques relating thereto is indication and prediction of the coolant flow reduction so that corrective action can be taken at a very early stage leading to significant savings in repair cost and increased availability of machines. That is, system 92 monitors coolant flow reduction and diagnoses the cause of the reduction.

Coolant flow reduction system 92 may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, system 92 may take the form of a computer program product embodied in any tangible medium of expression having computer-usable program code embodied in the medium. In this case, the computer program instructions of system 92 may be loaded onto a computer or other programmable data processing apparatus, such as the overall control system (not shown) for generator 100, to cause a series of operational steps to be performed on the computer or other programmable apparatus to produce a computer implemented process such that the instructions which execute on the computer or other programmable apparatus provide processes for implementing the functions/acts specified herein.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, or device. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, or transport the program for use by or in connection with the instruction execution system, apparatus, or device.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the generator's computer controller, partly on the controller, as a stand-alone software package, partly on the controller and partly on a remote computer or entirely on the remote computer or server. In the latter scenario, the remote computer may be connected to the generator's computer controller through any type of network, including a local area network (LAN) or a wide area network (WAN), or the connection may be made to an external computer (for example, through the Internet using an Internet Service Provider).

The block diagrams and FIGS. illustrate the architecture, functionality, and operation of possible implementations of systems, methods and computer program products according to various embodiments of the present invention. In this regard, each stated function may represent a module, segment, or portion of code, which comprises one or more executable instructions for implementing the specified logical function(s). It should also be noted that, in some alternative implementations, the functions noted may occur out of the order stated. For example, two steps described in succession may, in fact, be executed substantially concurrently, or may sometimes be executed in the reverse order, depending upon the functionality involved. It will also be noted that functions described herein can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and changes will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A coolant flow reduction monitoring system for a rotary electric machine having stator coils within a plurality of slots of a stator thereof, the stator coils cooled by a coolant flowing in a plurality of passages provided in the stator coils, the system comprising:
an outlet temperature sensor for measuring a coolant outlet temperature of the coolant in an outlet of at least one of the plurality of passages and outputting a signal indicative of each;
a slot temperature sensor for measuring a temperature in at least one slot at a location along a length of the at least one slot and outside of the stator coils therein, and outputting a signal indicative thereof;
an inlet temperature sensor for measuring a coolant inlet temperature of the coolant at an inlet to the plurality of passages and outputting a signal indicative thereof; and
a coolant flow reduction monitor for generating an alarm indicating a coolant flow reduction based on the at least one coolant outlet temperature, the at least one slot temperature and the coolant inlet temperature,
wherein the coolant flow reduction monitor generates the alarm in response to a rate of change of an average of a difference between the at least one coolant outlet temperature and the coolant inlet temperature exceeding a first threshold, and a rate of change of an average of a difference between the at least one slot temperature and the coolant inlet temperature exceeding a second threshold.

2. The system of claim 1, wherein the coolant flow reduction monitor is further configured to generate the alarm in response to a rate of change of a difference between a slot temperature of a selected slot and the coolant inlet temperature exceeding a third threshold, and a rate of change of a difference between the at least one coolant outlet temperature in the selected slot and the coolant inlet temperature exceeding a fourth threshold.

3. The system of claim 1, wherein the coolant flow reduction monitor generates the alarm in response to the coolant outlet temperature of a particular passage in a particular slot exceeding an average of the at least one coolant outlet temperature and the slot temperature for the particular slot in which the particular passage is positioned exceeding an average of the at least one slot temperature.

4. The system of claim 1, wherein the alarm includes an instruction including a corrective action to at least partially correct the coolant flow reduction.

5. The system of claim 1, further comprising a statistical analyzer for monitoring a change in the at least one slot temperature and a change in the at least one coolant outlet temperature, and predicting a failure time based on a benchmark case of the rotary electric machine.

6. The system of claim 1, further comprising a data analyzer for normalizing the at least one coolant outlet temperature, the at least one slot temperature and the coolant inlet temperature base on an operation condition of the rotary electric machine.

7. The system of claim 1, further comprising a sensor validation system for validating the temperature sensors in response to the signals being within a specified amplitude range.

8. An electric generator comprising:
a rotor;
a stator including stator coils within a plurality of slots, the stator coils cooled by a coolant flowing in a plurality of passages provided in the stator coils; and
a coolant flow reduction monitoring system including:
an outlet temperature sensor for measuring a coolant outlet temperature of the coolant in an outlet of at least one of the plurality of passages and outputting a signal indicative of each;
a slot temperature sensor for measuring a temperature in at least one slot at a location along a length of the at least one slot and outside of the stator coils therein, and outputting a signal indicative thereof;
an inlet temperature sensor for measuring a coolant inlet temperature of the coolant at an inlet to the plurality of passages and outputting a signal indicative thereof; and
a coolant flow reduction monitor for generating an alarm indicating a coolant flow reduction based on the at least one coolant outlet temperature, the at least one slot temperature and the coolant inlet temperature,
wherein the coolant flow reduction monitor generates the alarm in response to a rate of change of a difference between a slot temperature of a selected slot and the coolant inlet temperature exceeding a first threshold, and a rate of change of a difference between the at least one coolant outlet temperature in the selected slot and the coolant inlet temperature exceeding a second threshold.

9. The electric generator of claim 8, wherein the coolant flow reduction monitor is further configured to generate the alarm in response to a rate of change of an average of a difference between the at least one coolant outlet temperature and the coolant inlet temperature exceeding a third threshold, and a rate of change of an average of a difference between the at least one slot temperature and the coolant inlet temperature exceeding a fourth threshold.

10. The electric generator of claim 8, wherein the coolant flow reduction monitor generates the alarm in response to the coolant outlet temperature of a particular passage in a particular slot exceeding an average of the at least one coolant outlet temperature and the slot temperature for the particular slot in which the particular passage is positioned exceeding an average of the at least one slot temperature.

11. The electric generator of claim 8, wherein the alarm includes an instruction including a corrective action to at least partially correct the coolant flow reduction.

12. The electric generator of claim 8, further comprising a statistical analyzer for monitoring a change in the at least one slot temperature and a change in the at least one coolant outlet temperature, and predicting a failure time based on a benchmark case of the rotary electric machine.

13. The electric generator of claim 8, further comprising a data analyzer for normalizing the at least one coolant outlet temperature, the at least one slot temperature and the coolant inlet temperature base on an operation condition of the rotary electric machine.

14. The electric generator of claim 8, further comprising a sensor validation system for validating the temperature sensors in response to the signals being within a specified amplitude range.

15. A coolant flow reduction monitoring system for a rotary electric machine having stator coils within a plurality of slots of a stator thereof, the stator coils cooled by a coolant flowing in a plurality of passages provided in the stator coils, the system comprising:

an outlet temperature sensor for measuring a coolant outlet temperature of the coolant in an outlet of at least one of the plurality of passages and outputting a signal indicative of each;

a slot temperature sensor for measuring a temperature in at least one slot at a location along a length of the at least one slot and outside of the stator coils therein, and outputting a signal indicative thereof;

an inlet temperature sensor for measuring a coolant inlet temperature of the coolant at an inlet to the plurality of passages and outputting a signal indicative thereof; and a coolant flow reduction monitor for generating an alarm indicating a coolant flow reduction based on the at least one coolant outlet temperature, the at least one slot temperature and the coolant inlet temperature, wherein the coolant flow reduction monitor generates the alarm in response to a rate of change of a difference between a slot temperature of a selected slot and the coolant inlet temperature exceeding a first threshold, and a rate of change of a difference between the at least one coolant outlet temperature in the selected slot and the coolant inlet temperature exceeding a second threshold.

\* \* \* \* \*